United States Patent
Lee et al.

(10) Patent No.: US 12,095,115 B2
(45) Date of Patent: Sep. 17, 2024

(54) ELECTROLYTE MEMBRANE FOR ALL-SOLID-STATE BATTERY, AND ALL-SOLID-STATE BATTERY COMPRISING SAME

(71) Applicant: LG ENERGY SOLUTION, LTD., Seoul (KR)

(72) Inventors: Jung-Pil Lee, Daejeon (KR); Sung-Joong Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 622 days.

(21) Appl. No.: 17/413,213

(22) PCT Filed: May 11, 2020

(86) PCT No.: PCT/KR2020/006190
§ 371 (c)(1),
(2) Date: Jun. 11, 2021

(87) PCT Pub. No.: WO2020/226472
PCT Pub. Date: Nov. 12, 2020

(65) Prior Publication Data
US 2022/0069415 A1    Mar. 3, 2022

(30) Foreign Application Priority Data
May 9, 2019    (KR) ........................ 10-2019-0054533

(51) Int. Cl.
*H01M 50/446*    (2021.01)
*H01M 10/0565*   (2010.01)

(52) U.S. Cl.
CPC ..... *H01M 50/446* (2021.01); *H01M 10/0565* (2013.01); *H01M 2300/0091* (2013.01)

(58) Field of Classification Search
CPC .......... H01M 50/446; H01M 10/0565; H01M 2300/0091
See application file for complete search history.

(56) References Cited

U.S. PATENT DOCUMENTS 6,355,380 B1    3/2002   Yun et al.
6,544,682 B1    4/2003   Takami et al.
(Continued)

FOREIGN PATENT DOCUMENTS

CN    101381501 A  *   3/2009
CN    103026542 A      4/2013
(Continued)

OTHER PUBLICATIONS

Extended European Search Report for European Application No. 20802045.3, dated Mar. 24, 2022.
(Continued)

*Primary Examiner* — Christian Roldan
*Assistant Examiner* — Robert Gene West
(74) *Attorney, Agent, or Firm* — Birch, Stewart, Kolasch & Birch, LLP (57) ABSTRACT

In a solid electrolyte membrane according to the present disclosure, an ion conduction blocking layer is formed in the electrolyte membrane by a polymer material having low ionic conductivity by phase separation of polymer under the high temperature condition such as an increase in the internal temperature of a battery, to block the movement of lithium ions. The formed ion conduction blocking layer (hereinafter referred to as blocking layer) prevents thermal runaway and consequential explosions of the battery, thereby improving the heat resistance safety of the battery.

9 Claims, 4 Drawing Sheets

(56) References Cited

U.S. PATENT DOCUMENTS

| | | |
|---|---|---|
| 6,924,067 B1 | 8/2005 | Ito et al. |
| 2008/0268346 A1 | 10/2008 | Inda |
| 2009/0104523 A1 | 4/2009 | Mullin et al. |
| 2012/0189910 A1 | 7/2012 | Brune et al. |
| 2013/0063092 A1 | 3/2013 | Yang et al. |
| 2014/0234726 A1 | 8/2014 | Christensen et al. |
| 2016/0087306 A1 | 3/2016 | Lee et al. |
| 2017/0294678 A1 | 10/2017 | Lee et al. |
| 2018/0040904 A1* | 2/2018 | Choi .................. H01M 10/0525 |
| 2018/0331386 A1 | 11/2018 | Koh et al. |
| 2018/0342768 A1* | 11/2018 | Kwon .................... B60K 17/00 |
| 2019/0312300 A1* | 10/2019 | Ma ........................ C04B 35/111 |
| 2022/0069415 A1 | 3/2022 | Lee et al. |

FOREIGN PATENT DOCUMENTS

| | | | | |
|---|---|---|---|---|
| CN | 107799703 A | * | 3/2018 | ............ B32B 27/12 |
| EP | 3 002 814 A1 | | 4/2016 | |
| EP | 3 006 375 A1 | | 11/2016 | |
| JP | 2003-303621 A | | 10/2003 | |
| JP | 2004-96342 A | | 3/2004 | |
| JP | 2005-220271 A | | 8/2005 | |
| JP | 3919346 B2 | | 5/2007 | |
| JP | 2012-517687 A | | 8/2012 | |
| JP | 2016-62895 A | | 4/2016 | |
| JP | 2016-512649 A | | 4/2016 | |
| KR | 10-2001-0066972 A | | 9/2001 | |
| KR | 10-2002-0085942 A | | 11/2002 | |
| KR | 10-0942477 B1 | | 2/2010 | |
| KR | 10-2018-0124261 A | | 11/2018 | |
| KR | 10-2018-0124848 A | | 11/2018 | |
| KR | 20190047514 A | * | 5/2019 | |
| TW | 439309 B | | 6/2001 | |
| WO | WO 01/17051 A1 | | 3/2001 | |
| WO | WO 2007/142731 A2 | | 12/2007 | |
| WO | WO 2020/226472 A1 | | 11/2020 | |

OTHER PUBLICATIONS

International Search Report (PCT/ISA/210) issued in PCT/KR2010/006190, dated Aug. 14, 2020.

San et al., "Molecular Design of the Solid Copolymer Electrolyte-Poly(styn ethylene codide) for Lithium ion Batteries," No. 2. 201 pp. 101-117.

* cited by examiner

ELECTROLYTE MEMBRANE FOR ALL-SOLID-STATE BATTERY, AND ALL-SOLID-STATE BATTERY COMPRISING SAME

TECHNICAL FIELD

The present application claims the benefit of Korean Patent Application No. 10-2019-0054533 filed on May 9, 2019 with the Korean Intellectual Property Office, the disclosure of which is incorporated herein by reference in its entirety. The present disclosure relates to an electrolyte membrane for an all-solid-state battery with improved heat resistance safety and shut-down function and an all-solid-state battery comprising the electrolyte membrane.

BACKGROUND ART

When lithium ion batteries using liquid electrolytes are deformed by impacts or external environments, the liquid electrolytes leak or burn due to short circuits, causing overheat or explosions. Accordingly, it is very important to develop solid electrolytes with safety in the field of lithium ion secondary batteries.

Lithium secondary batteries using solid electrolytes have enhanced safety of the batteries, prevent the leakage of the electrolytes, leading to improved reliability of the batteries, and are easy to manufacture thin batteries. Additionally, they have improved energy density due to the use of lithium metal for the negative electrode, and accordingly, together with small secondary batteries, they gain much attention as next-generation batteries in expectation of high capacity secondary batteries for electric vehicles.

Solid electrolyte materials generally include polymer-based solid electrolyte, oxide-based solid electrolyte and sulfide-based solid electrolyte materials. When a thin-film free standing type electrolyte membrane is manufactured using the solid electrolyte material alone, defects such as tears or cracks or separation of the electrolyte material may occur during the manufacture of the battery or while in use. Particularly, when lithium metal is used as the negative electrode active material, there is a problem with the growth of lithium dendrites from the surface of the negative electrode, and when the grown lithium dendrites contact the positive electrode, a short circuit occurs in the battery. In the all-solid-state battery, the solid electrolyte membrane serves as an electrical insulator for the positive electrode and the negative electrode in place of the separator. Particularly, when a polymer material is used as the solid electrolyte, the solid electrolyte membrane may be damaged by the growth of lithium dendrites. When the electrolyte membrane is broken, electric currents gather in the broken part, causing rapid heat generation and consequential fires and explosions. Especially in the case of large batteries, there is a high likelihood that the above-described problem become serious due to a large amount of energy produced by the short circuit. Accordingly, it is necessary to develop electrolyte membranes that can perform the shut-down function quickly when a short circuit and its consequential rapid rise in the internal temperature of the battery occurs.

DISCLOSURE

Technical Problem

The present disclosure is designed to solve the above-described technical problem, and therefore the present disclosure is directed to providing a solid electrolyte membrane with a shut-down function and an all-solid-state battery comprising the same. These and other objects and advantages of the present disclosure will be understood by the following description. Additionally, it will be readily appreciated that the objects and advantages of the present disclosure may be realized by means or methods described in the appended claims and a combination thereof.

Technical Solution

The present disclosure is designed to solve the above-described problem. A first aspect of the present disclosure relates to a solid electrolyte membrane for an all-solid-state battery, comprising a mixture of a polymer material (A) having low ionic conductivity and a solid electrolyte material (B), wherein the solid electrolyte membrane has ionic conductivity of $1 \times 10^{-7}$ S/cm or above.

In the first aspect, according to a second aspect of the present disclosure, the polymer material (A) exhibits ionic conductivity of $9 \times 10^{-8}$ S/cm or less, and the solid electrolyte material (B) exhibits ionic conductivity of $1 \times 10^{-7}$ S/cm or above.

In at least one of the first and second aspects, according to a third aspect of the present disclosure, the polymer material (A) comprises at least one of a polyolefin-based polymer, a polystyrene-based polymer, a polyacrylate-based polymer, a polycarbide-based polymer and a polyester-based polymer.

In at least one of the first to third aspects, according to a fourth aspect of the present disclosure, the solid electrolyte material (B) comprises a polymer-based solid electrolyte material.

In the fourth aspect, according to a fifth aspect of the present disclosure, the solid electrolyte material (B) comprises the polymer-based solid electrolyte material in an amount of 90 wt % or more based on 100 wt % of the solid electrolyte material, and comprises a composite of a polymer resin and a lithium salt.

In at least one of the first to fifth aspects, according to a sixth aspect of the present disclosure, the solid electrolyte membrane has an ion conduction blocking layer comprising the polymer material (A), the ion conduction blocking layer being formed in the solid electrolyte membrane by a temperature change-induced phase separation of the solid electrolyte material (B) and the polymer material (A), and the temperature change is a temperature rise.

In at least one of the first to sixth aspects, according to a seventh aspect of the present disclosure, the solid electrolyte material (B) comprises a polymer-based solid electrolyte material, the polymer-based solid electrolyte material (C) comprises a composite of a polymer resin (C1) and a lithium salt (C2), and the polymer resin is a copolymer comprising a polymerizable unit that constitutes the polymer material (A).

In the seventh aspect, according to an eighth aspect of the present disclosure, the polymer resin may comprise at least one of a polyether-based polymer, a polycarbonate-based polymer, an acrylate-based polymer, a polysiloxane-based polymer, a phosphazene-based polymer, a polyethylene derivative, an alkylene oxide-based polymer, a phosphate ester-based polymer, polyalginate lysine, polyester sulfide, polyvinyl alcohol, a polyvinylidene fluoride-based polymer and a polymer including an ionic dissociable group, and comprises the polymerizable unit that constitutes the polymer material (A) in a polymer chain of the polymer resin.

In at least one of the seventh and eighth aspects, according to a ninth aspect of the present disclosure, the polymerizable unit that constitutes the polymer material (A) comprises at least one of an olefin-based polymerizable unit, a styrene-based polymerizable unit, an acryl-based polymerizable unit, a carbide-based polymerizable unit, and an ester-based polymerizable unit.

In at least one of the seventh to ninth aspects, according to a tenth aspect of the present disclosure, the polymer resin comprises Polystyrene-co-Polyethylene oxide.

In at least one of the seventh to tenth aspects, according to an eleventh aspect of the present disclosure, the polymer resin comprises the polymerizable unit that constitutes the polymer material (A) in an amount of 51 wt % to 99 wt % based on 100 wt % of the polymer resin.

In at least one of the seventh to eleventh aspects, according to a twelfth aspect of the present disclosure, the polymer material (A) is present in an amount of 7 parts by weight to 80 parts by weight based on 100 parts by weight of the solid electrolyte material (B).

In at least one of the seventh to twelfth aspects, according to a thirteenth aspect of the present disclosure, the polymer material (A) has a molecular weight (Mn) of 1 kg/mol to 10,000 kg/mol.

In at least one of the first to thirteenth aspects, according to a fourteenth aspect of the present disclosure, either a glass transition temperature or a melting temperature of the polymer material (A) or both is 150° C. or less.

Advantageous Effects

In the solid electrolyte membrane according to the present disclosure, an ion conduction blocking layer is formed in the electrolyte membrane by the phase separation of polymer under the high temperature condition such as an increase in the internal temperature of the battery, to block the movement of lithium ions. The formed 'ion conduction blocking layer' (hereinafter referred to as 'blocking layer') prevents thermal runaway and consequential explosions of the battery, thereby improving the heat resistance safety of the battery.

BRIEF DESCRIPTION OF THE DRAWINGS

The accompanying drawings illustrate a preferred embodiment of the present disclosure, and together with the detailed disclosure, serve to provide a further understanding of the technical aspects of the present disclosure, and the present disclosure should not be construed as being limiting to the drawings. In the drawings, for clarity of description, the shape, size, scale or proportion of the elements may be exaggerated for emphasis.

DETAILED DESCRIPTION

Hereinafter, the embodiments of the present disclosure will be described in detail. Prior to the description, it should be understood that the terms or words used in the specification and the appended claims should not be construed as limited to general and dictionary meanings, but rather interpreted based on the meanings and concepts corresponding to the technical aspects of the present disclosure on the basis of the principle that the inventor is allowed to define terms appropriately for the best explanation. Therefore, the context in the embodiments described herein is just a most preferred embodiment of the present disclosure, but not intended to fully describe the technical aspects of the present disclosure, so it should be understood that other equivalents and modifications could have been made thereto at the time the application was filed.

The term ⌈comprises⌋ when used in this specification, specifies the presence of stated elements, but does not preclude the presence or addition of one or more other elements, unless the context clearly indicates otherwise.

The terms ⌈about⌋ and ⌈substantially⌋ are used herein in the sense of at, or nearly at, when given the manufacturing and material tolerances inherent in the stated circumstances and are used to prevent the unscrupulous infringer from unfairly taking advantage of the present disclosure where exact or absolute figures are stated as an aid to understanding the present disclosure.

⌈A and/or B⌋ when used in this specification, specifies ⌈either A or B or both⌋.

The terms as used in the following detailed description are for the purpose of convenience, but not intended to being limiting. The terms 'right', 'left' 'top' and 'bottom' refer to the directions in the drawings to which reference is made. The terms 'inward' and 'outward' refer to the directions toward or away from the geometrical centers of the designated devices, systems and elements thereof. The terms 'front', 'rear', 'up', 'down' and related words and phrases refer to the locations and directions in the drawings to which reference is made and are not limiting. These terms include the above words and their derivatives and synonyms.

The present disclosure relates to an electrolyte membrane for an all-solid-state battery and an all-solid-state battery comprising the same. The solid electrolyte membrane according to the present disclosure acts as an insulating barrier and ion conducting layer between the positive electrode and the negative electrode in the general battery operating temperature range, and when the internal temperature of the battery sharply rises in the event that a short circuit occurs, an ion conduction blocking layer is formed to control the operation of the battery.

In the present disclosure, the ion conduction blocking layer is formed by the melting and phase separation of a polymer material A having low ionic conductivity included in the solid electrolyte membrane.

Figure 1:
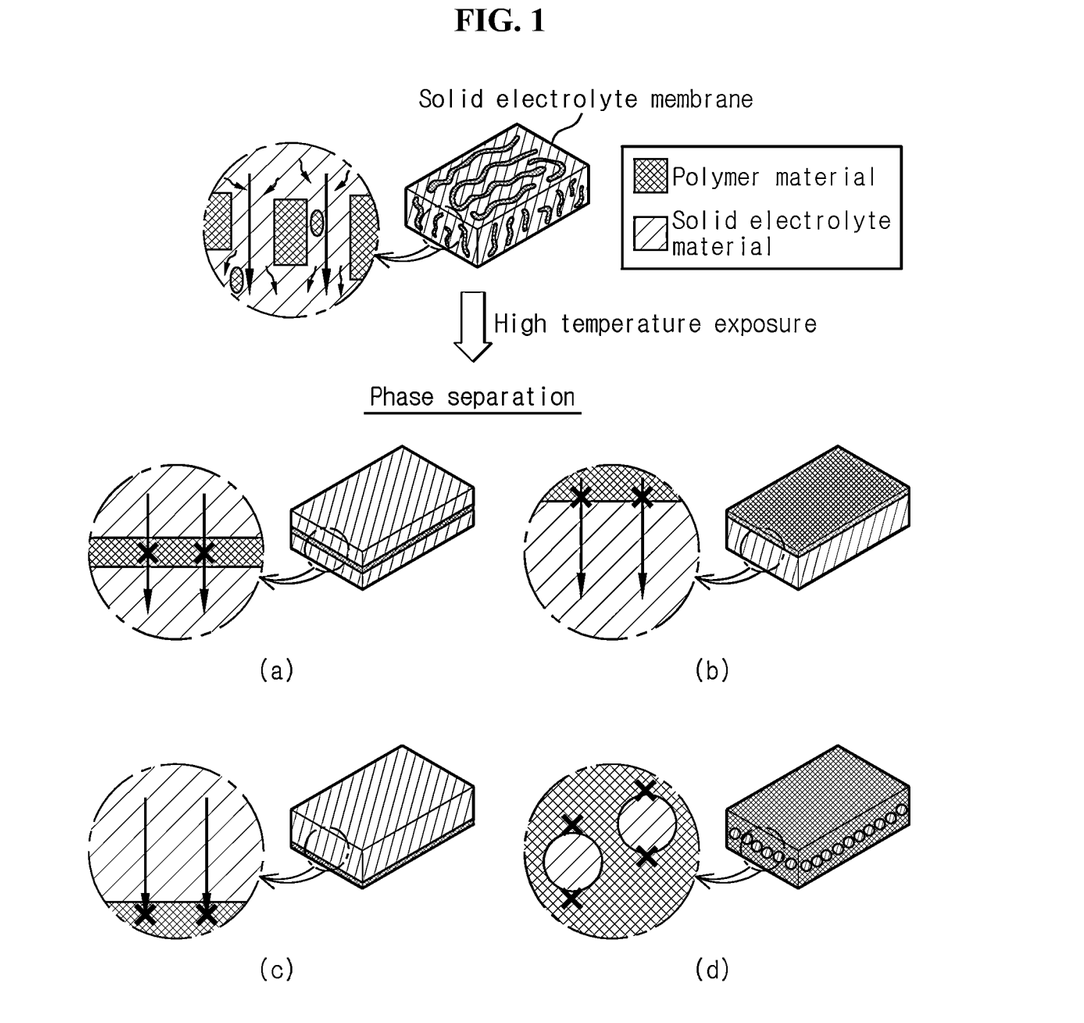
FIG. 1 schematically illustrates the structure of a solid electrolyte membrane according to the present disclosure and the mechanism of phase separation-driven blocking layer formation.

FIG. 1 schematically illustrates the solid electrolyte membrane according to the present disclosure and the formation mechanism of the ion conduction blocking layer. The solid electrolyte membrane of the present disclosure will be described in detail with reference to FIG. 1.

The solid electrolyte membrane of the present disclosure is interposed between positive and negative electrodes of an all-solid-state battery and acts as an electrical insulating and ion conducting layer between the positive electrode and the negative electrode. In an embodiment of the present disclosure, the solid electrolyte membrane may exhibit ionic conductivity of $1\times10^{-7}$ S/cm or above. In a specific embodiment of the present disclosure, the solid electrolyte membrane may exhibit ionic conductivity of $1\times10^{-7}$ S/cm or above in the room temperature (20° C. to 30° C.) and higher temperature condition. In the present disclosure, the solid electrolyte membrane comprises the polymer material A and a solid electrolyte material B, and the polymer material A has low ionic conductivity.

In an embodiment of the present disclosure, the solid electrolyte material B exhibits ionic conductivity of $1\times10^{-7}$ S/cm or above, for example, $1\times10^{-6}$ S/cm or above, or $1\times10^{-5}$ S/cm or above, and may include at least one of a polymer-based solid electrolyte material, an oxide-based solid electrolyte material and a sulfide-based solid electrolyte. In a specific embodiment, the solid electrolyte material B may exhibit ionic conductivity of $1\times10^{-6}$ S/cm or above, or $1\times10^{-5}$ S/cm or above in the room temperature (20° C. to 30° C.) and higher temperature range. Preferably, the solid electrolyte material B includes the polymer-based solid electrolyte material in an amount of 80 wt % or more, 90 wt % or more, or 99 wt % or more. In an embodiment of the present disclosure, the solid electrolyte material B may include the polymer-based solid electrolyte material in an amount of 100 wt %. As described below, the polymer material A and the solid electrolyte material B melt at least in part under the high temperature condition, and the solid electrolyte membrane becomes flowable, thereby inducing phase separation of the polymer material A and the solid electrolyte material B in the solid electrolyte membrane. As a result, as shown in FIG. 1, the ion conduction blocking layer including the polymer material A may be formed in the solid electrolyte membrane. That is, in the present disclosure, the solid electrolyte material B preferably includes the polymer-based solid electrolyte material in the above-described weight ratio range in terms of phase separation of the polymer material A.

The polymer-based solid electrolyte is a composite of a lithium salt and a polymer resin, i.e., a polymer electrolyte material formed by adding a polymer resin to a solvated lithium salt, and may exhibit ionic conductivity of about $1\times10^{-7}$ S/cm or above. In a specific embodiment of the present disclosure, the polymer-based solid electrolyte may exhibit ionic conductivity of about $1\times10^{-7}$ S/cm or above in the room temperature condition (20° C. to 30° C.) and higher temperature condition.

The polymer resin is a polymer resin having ionic conductivity, and non-limiting examples of the polymer resin may include polyether-based polymer, polycarbonate-based polymer, acrylate-based polymer, polysiloxane-based polymer, phosphazene-based polymer, polyethylene derivatives, polyalkylene oxide-based polymer such as polyethylene oxide or polypropylene oxide, polyvinyl acetate-based polymer, phosphate ester-based polymer, polyacrylonitrile-based polymer, polyalginate lysine, polyester sulfide, polyvinyl alcohol-based polymer, polyvinylidene fluoride-based polymer and polymer including ionic dissociable groups. The polymer-based solid electrolyte may include at least one of them as the polymer resin. According to another embodiment of the present disclosure, the polymer resin may include, for example, a branched copolymer, a comb-like polymer resin and a crosslinked polymer resin, obtained by copolymerization of a comonomer such as at least one amorphous polymer of PMMA, polycarbonate, polysiloxane (pdms) and phosphazene into the main chain of polyethylene oxide (PEO), and the polymer electrolyte may include at least one of them as the polymer resin.

In an embodiment of the present disclosure, the polymer resin is an ion conducting polymer resin, and may include a homopolymer resin including one polymerizable unit or a copolymer including two or more polymerizable units. For example, the polymer resin may be an alkylene oxide-based copolymer including ethylene oxide and/or propylene oxide as the polymerizable unit. The copolymer may include at least one of a random copolymer, a block copolymer and a graft copolymer. The block copolymer has a repeating different segments (blocks) in which a specific type of monomers are polymerized to form a segment (or block) and a different type of monomers are polymerized to form another segment (or block). The graft copolymer is obtained by attaching grafted side chains of specific monomers onto the main chain of different monomers.

Additionally, the polymer resin has the molecular weight (Mn) ranging from 1 kg/mol to 10,000 kg/mol. In terms of the physical strength of the solid electrolyte membrane, the molecular weight is preferably 1 kg/mol or more. In terms of the molecular mobility and phase separation effect, the molecular weight is preferably 10,000 kg/mol or less.

In an embodiment of the present disclosure, the molecular weight (Mn) may be measured using gel permeation chromatography (GPC). The GPC is a type of liquid-solid elution chromatography, and is a method that separates molecules in descending order according to the size of solute molecules. For example, in the GPC method, a target polymer resin may be dissolved in a solvent and the molecular weight may be measured using a refractive index (RI) detector. In an embodiment, the RI detector may include, for example, Agilent 1200 series GPC instrument, but is not limited thereto.

In the electrolyte of the present disclosure, the lithium salt is an ionizable lithium salt and may be represented as $Li^+X^-$. Although not particularly limited, the anion of the lithium salt may include, for example, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

In an embodiment of the present disclosure, the polymer material A has low ionic conductivity. Preferably, the polymer material A may have ionic conductivity of $9\times10^{-8}$ S/cm or less. For example, the polymer material A may exhibit ionic conductivity of $9\times10^{-8}$ S/cm or less in the room temperature condition (about 20° C. to 30° C.). Additionally, the polymer material A preferably maintains the above-described range of low ionic conductivity during the operation of the battery, for example, when the temperature rises. In an embodiment of the present disclosure, specific examples of the polymer material A may include at least one of polyolefin-based polymer having an olefin-based polymerizable unit such as ethylene, butylene and propylene; polystyrene-based polymer having a polymerizable unit such as styrene; polyacrylate-based polymer having an acryl-based polymerizable unit of alkyl(methacrylate) such as polymethylmethacrylate (PMMA); polycarbide-based polymer having a carbide-based polymerizable unit; polyester-based polymer having an ester-based polymerizable unit such as polyethyleneterephthalate (PET); and polylactone-based polymer.

In an embodiment of the present disclosure, the polymer materials may include a copolymer, and the copolymer may include the polymerizable unit that constitutes the polymer resin of the polymer-based solid electrolyte as the polymerizable unit. Preferably, the polymer material includes a copolymer including the polymerizable unit that constitutes the polymer resin actually used in the solid electrolyte membrane. For example, when polyethylene oxide (PEO) is used as the polymer resin of the polymer-based solid electrolyte, the polymer material A may include a copolymer including ethylene oxide as the polymerizable unit. In a specific embodiment, the polymer material A may include a polystyrene-based copolymer including a styrene-based polymerizable unit and an ethylene oxide-based polymerizable unit under the ionic conductivity condition of $9 \times 10^{-8}$ S/cm or less.

In an embodiment of the present disclosure, the polymer material A has the molecular weight (Mn) ranging from 1 kg/mol to 10,000 kg/mol. In terms of the physical strength of the solid electrolyte membrane, the molecular weight is preferably 1 kg/mol or more. In terms of the molecular mobility and phase separation effect, the molecular weight is preferably 10,000 kg/mol or less.

Additionally, in an embodiment of the present disclosure, the polymer material A preferably has the glass transition temperature Tg and/or the melting temperature Tm of 150° C. or less. When the melting temperature exceeds the above-described range, even though the internal temperature of the battery rises, the polymer material A does not melt, chain mobility is not produced and phase separation does not occur, which makes it difficult to achieve a desired effect.

In a specific embodiment of the present disclosure, when considering the phase separation aspect, in the polymer-based solid electrolyte material, the polymer resin may include a copolymer, and the copolymer may include the polymerizable unit that constitutes the polymer material A. Preferably, the polymerizable unit that constitutes the polymer material A constitutes the polymer material A included in the corresponding solid electrolyte membrane.

Describing in detail, the copolymer may include at least one of polyether-based polymer, polycarbonate-based polymer, acrylate-based polymer, polysiloxane-based polymer, phosphazene-based polymer, polyethylene derivatives, alkylene oxide-based polymer such as polyethylene oxide or polypropylene oxide, phosphate ester-based polymer, polyalginate lysine, polyester sulfide, polyvinyl alcohol-based polymer, polyvinylidene fluoride-based polymer and polymer including ionic dissociable groups, and they may include the polymerizable unit that constitutes the polymer material A in the polymer chain. In an embodiment of the present disclosure, the polymerizable unit that constitutes the polymer material A includes, for example, at least one of an olefin-based polymerizable unit, a styrene-based polymerizable unit, an acryl-based polymerizable unit, a carbide-based polymerizable unit, and an ester-based polymerizable unit. For example, when polystyrene is used as the polymer material A in the solid electrolyte membrane, the polymer resin may include a copolymer including a styrene-based polymerizable unit as the polymerizable unit. A specific example of the polymer resin may include Polystyrene-co-Polyethyleneoxide.

In the present disclosure, the polymer resin may be represented by the following [Chemical Formula 1].

-[$P_A$]$_n$-[$P_B$]$_m$-          [Chemical Formula 1]

In the above Chemical Formula 1, $P_A$ is the polymerizable unit that constitutes the polymer material A, and its specific example may include a polymerizable unit of polystyrene, and $P_B$ is a polymerizable unit that constitutes the ion conducting polymer resin, and its specific example may include a polymerizable unit of polyethylene oxide. Additionally, in the above Formula 1, each of m and n is independently an integer of 1 or greater. In an embodiment of the present disclosure, the polymer resin may include at least one of a block copolymer and a graft copolymer including $P_A$ and $P_B$ as the polymerizable unit. When the polymer resin has the above-described feature, the weight fraction of $P_B$ relative to 100 wt % of the polymer resin is preferably in the range of 51 wt % to 99 wt %, and preferably 60 wt % to 99 wt %.

In an embodiment of the present disclosure, the weight fraction (wt %) may be measured through thermogravimetric analysis (TGA) or Gas chromatography mass spectrometry (GC-Mass).

Additionally, when the polymer resin includes such copolymer, the polymer material A may be present in an amount of 7 parts by weight to 80 parts by weight, and preferably 7 parts by weight to 50 parts by weight based on 100 parts by weight of the solid electrolyte material B. For example, the polymer material A is present in an amount of 7 parts by weight to 30 parts by weight, or 7 parts by weight to 15 parts by weight. When the amount of the polymer material A is lower, the ion conduction blocking layer may not be formed or formation of the ion conduction blocking layer may be delayed, and when the amount of the polymer material A exceeds the above-described range, the ionic conductivity reduces and the battery cannot normally operate.

In the present disclosure, the thickness of the solid electrolyte membrane may have an appropriate range in the range of about 100 μm or less. For example, the thickness of the solid electrolyte membrane may range from about 5 μm to 100 μm, or from 10 μm to 90 μm, or from 15 μm to 90 μm. The solid electrolyte membrane may have an appropriate thickness in the above-described range, taking into account the ionic conductivity, the physical strength and the energy density of the used battery. For example, in terms of the ionic conductivity or energy density, the thickness may be 80 μm or less, or 70 μm or less, or 60 μm or less, or 50 μm or less. In terms of the physical strength, the thickness may be 20 μm or more, or 30 μm or more, or 40 μm or more.

As described above, in the solid electrolyte membrane according to the present disclosure, a temperature change, in particular, a temperature rise induces phase separation of the solid electrolyte material B and the polymer material A to form the ion conduction blocking layer including the polymer material A in the solid electrolyte membrane. That is, the polymer material A having low ionic conductivity in the solid electrolyte membrane melts under a specific temperature condition to form the ion conduction blocking layer in the solid electrolyte membrane due to the phase separation behaviors (see FIG. 1). The formed ion conduction blocking layer blocks the movement of ions between the positive electrode and the negative electrode, and thus the battery stops working. That is, when the internal temperature of the battery sharply rises, the battery stops working, thereby preventing further increases in temperature or explosions of the battery due to the temperature rise.

FIG. 1 schematically illustrates the structure of the solid electrolyte membrane of the present disclosure and the formation mechanism of the blocking layer by phase separation of the polymer material in the solid electrolyte membrane. In FIG. 1, the black arrow indicates the movement of lithium ions. Under the general battery operating temperature, the polymer material A is randomly distributed in the solid electrolyte membrane and does not impede the transport of lithium ions between the positive electrode and the negative electrode. Accordingly, the solid electrolyte membrane exhibits ionic conductivity derived from the solid electrolyte material B. When the internal temperature of the battery rises, flowability of the polymer material A and the solid electrolyte material B increases. Particularly, when a large part of the solid electrolyte material B includes a polymer-based solid electrolyte material, the solid electrolyte membrane melts, inducing phase separation of the polymer-based solid electrolyte material and the polymer material. As a result, the polymer material A may form the blocking layer in a layer shape within the solid electrolyte membrane, and ion conduction is blocked by the formation of the blocking layer. As schematically shown in FIG. 1, the blocking layer may be formed in a layer shape within the solid electrolyte membrane as shown in (a), (b) and (c). The location of the blocking layer is shown for the purpose of illustration and is not limited to the shown location, and the blocking layer may be formed at any location on the basis of the thickness of the solid electrolyte membrane. Alternatively, the solid electrolyte membrane may be formed such that the polymer material wraps the solid electrolyte material by phase separation as shown in (d) of FIG. 1. When the phase separation occurs as shown in (d) of FIG. 1, it appears that the blocking layer is formed on both the top and bottom of the solid electrolyte membrane. One or more blocking layers may be formed in the solid electrolyte membrane.

The blocking layer is formed from a high concentration of the polymer material A in a local region within the solid electrolyte membrane by phase separation in such a way as to suppress ion conduction in the thickness direction of the solid electrolyte membrane, and is not limited to a specific shape. For example, the blocking layer may be formed in a layer shape within the solid electrolyte membrane or on one surface of the solid electrolyte membrane. The layer shape may be formed at a predetermined depth of the solid electrolyte membrane or over the entire surface, or may be formed in the shape of a layer of small droplets of the melted polymers. The droplets may put together to form a layer. FIG. 1 illustrates various embodiments of the blocking layer. When the blocking layer develops as the temperature of the battery rises, ion transport is blocked and the battery stops working, thereby improving the heat resistance safety of the battery.

The solid electrolyte membrane according to the present disclosure may be prepared, for example, by the following method, but is not particularly limited thereto.

First, the solid electrolyte material B and the polymer material A are added to a suitable solvent to prepare a polymer solution for preparing a solid electrolyte membrane.

The concentration of the polymer solution may be appropriately adjusted to a sufficient level for uniform coating of the solid electrolyte membrane and is not limited to a specific range. The solvent may include, without limitation, any type of solvent that can be removed through a drying process without changing the properties of the added component, and may be appropriately selected according to the used material. For example, when alkylene oxide such as ethylene oxide (PEO) is used for polymer resin, acetonitrile may be used for the solvent. Subsequently, the slurry is applied to a release sheet such as a terephthalate film and formed into the shape of a film having a predetermined thickness. A known coating method such as a doctor blade may be used to apply and form. Subsequently, drying is performed to remove the solvent, thereby obtaining the solid electrolyte membrane.

Additionally, the present disclosure provides an all-solid-state battery comprising the above-described solid electrolyte membrane. The all-solid-state battery comprises a positive electrode, a negative electrode and a solid electrolyte membrane. In an embodiment of the present disclosure, the negative electrode may comprise lithium metal as a negative electrode active material.

In the present disclosure, the negative electrode and the positive electrode may comprise a current collector and an electrode active material layer formed on the surface of the current collector, and the active material layer may comprise electrode active material particles and a solid electrolyte material. In an embodiment of the present disclosure, the negative electrode may be manufactured using the current collector itself without forming the active material layer on the surface of the current collector. Additionally, each electrode may further comprise at least one of a conductive material and a binder resin where necessary. Additionally, the electrode may further comprise various types of additives to supplement or improve the physical and chemical properties of the electrode.

In the present disclosure, the negative electrode active material may include lithium metal as the negative electrode active material of lithium ion secondary batteries, and in addition to the lithium metal, any material that can be used as the negative electrode active material may be used. For example, the negative electrode active material may further include at least one selected from carbon such as non-graphitizable carbon and graphite-based carbon; metal composite oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group I, Group II and Group III elements of the periodic table, halogen; $0 < x \leq 1$; $1 \leq y \leq 3$; $1 \leq z \leq 8$); lithium alloys; silicon-based alloys; tin-based alloys; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ $Bi_2O_3$; conductive polymer such as polyacetylene; Li—Co—Ni based materials; titanium oxide; lithium titanium oxide.

The electrode active material of the positive electrode may include, without limitation, any type of positive electrode active material of lithium ion secondary batteries. For example, the positive electrode active material may include at least one of layered compounds such as lithium cobalt oxide ($LiCoO_2$) and lithium nickel oxide ($LiNiO_2$) or compounds with one or more transition metal substitution; lithium manganese oxide of Formula $Li_{1+x}Mn_{2-x}O_4$ (x=0 to 0.33), $LiMnO_3$, $LiMn_2O_3$, $LiMnO_2$; lithium copper oxide ($Li_2CuO_2$); vanadium oxide such as $LiV_3O_8$, $LiFe_3O_4$, $V_2O_5$, $Cu_2V_2O_7$; Ni-site type lithium nickel oxide represented by Formula $LiNi_{1-x}M_xO_2$ (M=Co, Mn, Al, Cu, Fe, Mg, B or Ga, x=0.01 to 0.3); lithium manganese composite oxide represented by Formula $LiMn_{2-x}M_xO_2$ (M=Co, Ni, Fe, Cr, Zn or Ta, x=0.01 to 0.1) or $Li_2Mn_3MO_8$ (M=Fe, Co, Ni, Cu or Zn); lithium manganese composite oxide of spinel structure represented by $LiNi_xMn_{2-x}O_4$; $LiMn_2O_4$ with partial substitution of alkali earth metal ion for Li in Formula; disulfide compounds; $Fe_2(MoO_4)_3$. However, the positive electrode active material is not limited thereto.

In the present disclosure, the current collector may be, for example, a metal plate that has electrical conductivity, and a suitable current collector may be used according to the polarity of the electrode among the current collectors that are well known in the field of secondary batteries.

In the present disclosure, the conductive material is generally included in an amount of 1 wt % to 30 wt % based on the total weight of the mixture including the electrode active material. The conductive material is not limited to a particular type and may include those having conductivity without causing a chemical change in the corresponding battery, for example, at least one selected from graphite such as natural graphite or artificial graphite, carbon black such as carbon black, acetylene black, ketjen black, channel black, furnace black, lamp black and thermal black; conductive fibers such as carbon fibers or metal fibers; fluorocarbon; metal powder such as aluminum powder and nickel powder; conductive whiskers such as zinc oxide and potassium titanate; conductive metal oxide such as titanium oxide; conductive materials such as polyphenylene derivatives.

In the present disclosure, the binder resin is not limited to a particular type and may include any type of component that assists in the binding of the active material and the conductive material and binding to the current collector, for example, polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene monomer (EPDM), sulfonated EPDM, styrene butadiene rubber, fluorine rubber and a variety of copolymers. The binder resin may be generally included in the range of 1 wt % to 30 wt %, or 1 wt % to 10 wt % based on 100 wt % of the electrode layer.

In the present disclosure, each electrode active material layer may comprise at least one type of additive of an oxidation stabilizing agent, a reduction stabilizing agent, a flame retardant, a heat stabilizer and an antifogging agent where necessary.

In the present disclosure, the solid electrolyte material included in the electrode may include at least one of a polymer-based solid electrolyte, an oxide-based solid electrolyte and a sulfide-based solid electrolyte. In the present disclosure, with regard to the description of the polymer-based solid electrolyte material, a reference is made to the foregoing description.

The oxide-based solid electrolyte material contains oxygen (O) and has ionic conductivity of metal belonging to Group I or II of the periodic table. Non-limiting examples of the oxide-based solid electrolyte material may include at least one selected from LLTO-based compounds, $Li_6La_2CaTa_2O_{12}$, $Li_6La_2ANb_2O_{12}$ (A is Ca or Sr), $Li_2Nd_3TeSbO_{12}$, $Li_3BO_{2.5}N_{0.5}$, $Li_9SiAlO_8$, LAGP-based compounds, LATP-based compounds, $Li_{1+x}Ti_{2-x}Al_xSi_y(PO_4)_{3-y}$ ($0 \leq x \leq 1$, $0 \leq y \leq 1$), $LiAl_xZr_{2-x}(PO_4)_3$ ($0 \leq x \leq 1$, $0 \leq y \leq 1$), $LiTi_xZr_{2-x}(PO_4)_3$ ($0 \leq x \leq 1$, $0 \leq y \leq 1$), LISICON-based compounds, LIPON-based compounds, perovskite-based compounds, NASICON-based compounds and LLZO-based compounds. However, the oxide-based solid electrolyte material is not particularly limited thereto.

The sulfide-based solid electrolyte material contains sulfur (S) and has ionic conductivity of metal belonging to Group I or Group II of the periodic table, and may include Li—P—S-based glass or Li—P—S-based glass ceramics. Non-limiting examples of the sulfide-based solid electrolyte may include at least one of $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$ and $Li_2S$—$GeS_2$—ZnS. However, the sulfide-based solid electrolyte material is not particularly limited thereto.

In the solid electrolyte material, in the case of the positive electrode, electrolyte materials with good oxidation stability may be used as the solid electrolyte. In the case of the negative electrode, electrolyte materials with good reduction stability may be used as the solid electrolyte. However, the present disclosure is not limited thereto, and due to the main role of transporting lithium ions in the electrode, any material having high ionic conductivity of, for example, $10^{-7}$ s/cm or above, or $10^{-5}$ s/cm or above, may be used without limitation.

Additionally, the present disclosure provides a secondary battery having the above-described structure. Additionally, the present disclosure provides a battery module including the secondary battery as a unit battery, a battery pack including the battery module and a device including the battery pack as a power source. In this instance, a specific example of the device may include, but is not limited to, power tools; electric vehicles including Electric Vehicles (EVs), Hybrid Electric Vehicles (HEVs), Plug-in Hybrid Electric Vehicles (PHEVs); electric two wheelers including E-bikes and E-scooters; electric golf carts; and power storage systems, operated by power from an electric motor.

Hereinafter, the present disclosure is described in more detail through examples, but the following examples are provided to describe the present disclosure by way of illustration, and the scope of the present disclosure is not limited thereto.

1. Preparation of Solid Electrolyte Membrane

Example 1

Polystyrene-co-Polyethylene oxide (PS-b-PEO, ionic conductivity: $5 \times 10^6$ (room temperature condition)) and polystyrene (molecular weight (Mn): 7 kg/mol, glass transition temperature (Tg: 100° C.) are added to a solvent tetrahydrofuran (THF) at a weight ratio of 9:1 to prepare a 5 wt % polymer solution. The PS-b-PEO is a copolymer of PS and PEO with terminal bonds, and the molecular weight (Mn) of the PS is 16.kg/mol and the molecular weight (Mn) of the PEO is 110 kg/mol. In this instance, a lithium salt LiTFSI is added such that [EO]/[Li$^+$]=18/1 (mole ratio). The polymer solution is stirred overnight at 60° C. to sufficiently dissolve Ps-b-PEO and the lithium salt. T The polymer solution is coated at 1000 rpm for 1 min through spin coating and dried overnight in a vacuum condition at room temperature. In this way, a solid electrolyte membrane is obtained. The obtained solid electrolyte membrane is about 30 μm in thickness.

Example 2

A solid electrolyte membrane is obtained by the same method as example 1 except that Ps-b-PEO and polystyrene are added at a weight ratio of 80:20 and the thickness is 50 μm.

Comparative Example 1

Polyethylene oxide (PEO, Mw=4,000,000 g/mol) is dissolved in a solvent acetonitrile (AN) to prepare a 4 wt % polymer solution. In this instance, a lithium salt LiTFSI is added such that [EO]/[Li$^+$]=18/1 (mole ratio). The polymer solution is stirred overnight at 70° C. to sufficiently dissolve PEO and the lithium salt. Subsequently, an additive solution including an initiator and a curing agent is prepared. Polyethylene glycol diacrylate (PEGDA, Mw=575) is used for the curing agent, and benzoyl peroxide (BPO) is used for the initiator. The PEGDA is present in an amount of 20 wt % based on the PEO, and the BPO is present in an amount of 1 wt % based on the PEGDA. The used solvent is acetonitrile. The additive solution is stirred for about 1 hour to mix the added components well. Subsequently, the additive solution is added to the polymer solution, and the two solutions are sufficiently mixed together. The mixed solution is applied and coated on a release film using a doctor blade. The coating gap is 800 μm, and the coating speed is 20 mm/min. The release film coated with the solution is moved to a glass plate, keeping it horizontal, dried overnight in the room temperature condition, and dried in a vacuum condition at 100° C. for 12 hours. In this way, a solid electrolyte membrane is obtained. The obtained solid electrolyte membrane is about 50 μm in thickness.

2. High Temperature Exposure Experiment

Examples 1-1 to 1-3

Three solid electrolyte membrane samples are prepared through example 1. After example 1-1 is maintained in the room temperature condition, example 1-2 in the exposure condition to 100° C. for 1 hour and example 1-3 in the exposure condition to 100° C. for 12 hours, they are collected, and ionic conductivity is measured. The following [Table 1] summarizes the ionic conductivity measurement results.

The ionic conductivity is measured by the following method. The solid electrolyte membrane according to each example is cut into a round shape of 1.7671 cm$^2$. The solid electrolyte membrane is interposed between two sheets of stainless steel (SUS) to manufacture a coin cell. The electrochemical impedance is measured under the amplitude of 10 mV and the scan range of 500 Khz to 20 MHz at 60° C. using an analyzer (VMP3, Bio logic science instrument), and ionic conductivity is calculated based on the measurements.

TABLE 1

|  | Ionic conductivity (S/cm, 60° C.) |
|---|---|
| Example 1-1 | 5E−05 (5 × 10$^{-5}$) |
| Example 1-2 | 9E−07 (9 × 10$^{-7}$) |
| Example 1-3 | 8E−08 (8 × 10$^{-8}$) |

The solid electrolyte membrane of example 1-1 maintained at room temperature exhibits a sufficient range of ionic conductivity to operate the battery, and example 1-3 maintained in the high temperature condition for 12 hours or longer exhibits a level of ionic conductivity that is impossible to operate the battery due to ionic conductivity reduction in the high temperature condition.

Figure 2:
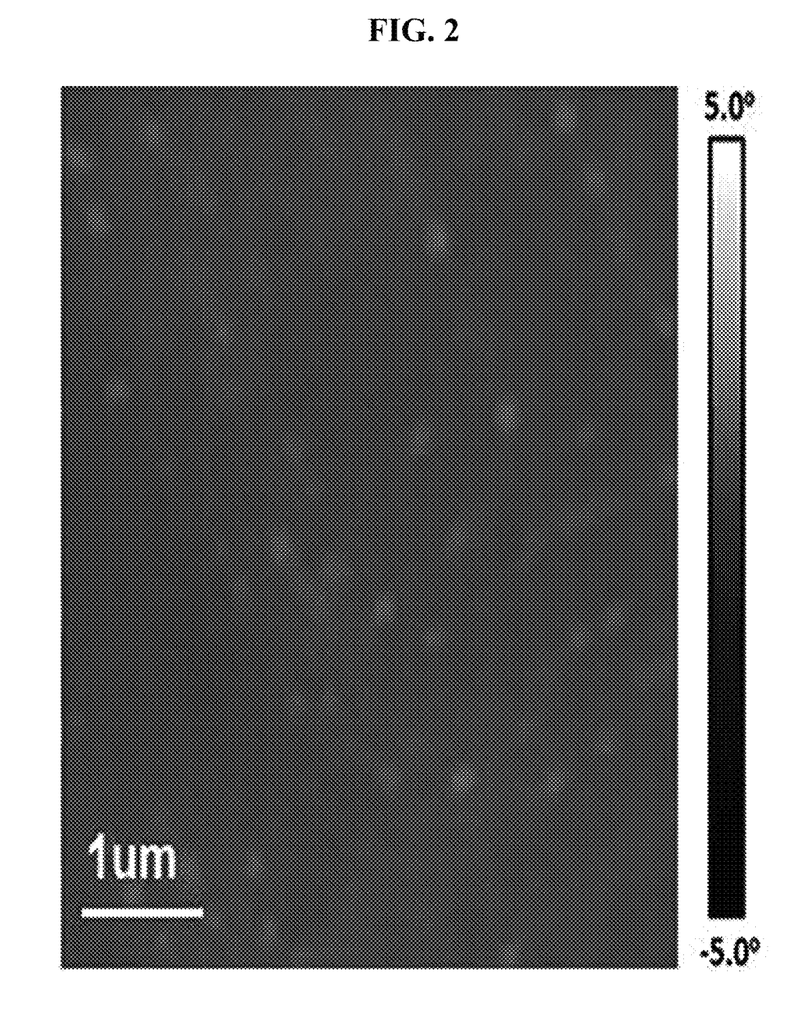
FIGS. 2 to 4 show atomic force microscopy (AFM) phase-mode images before and after high temperature exposure of a solid electrolyte membrane according to an embodiment of the present disclosure.
Figure 3:
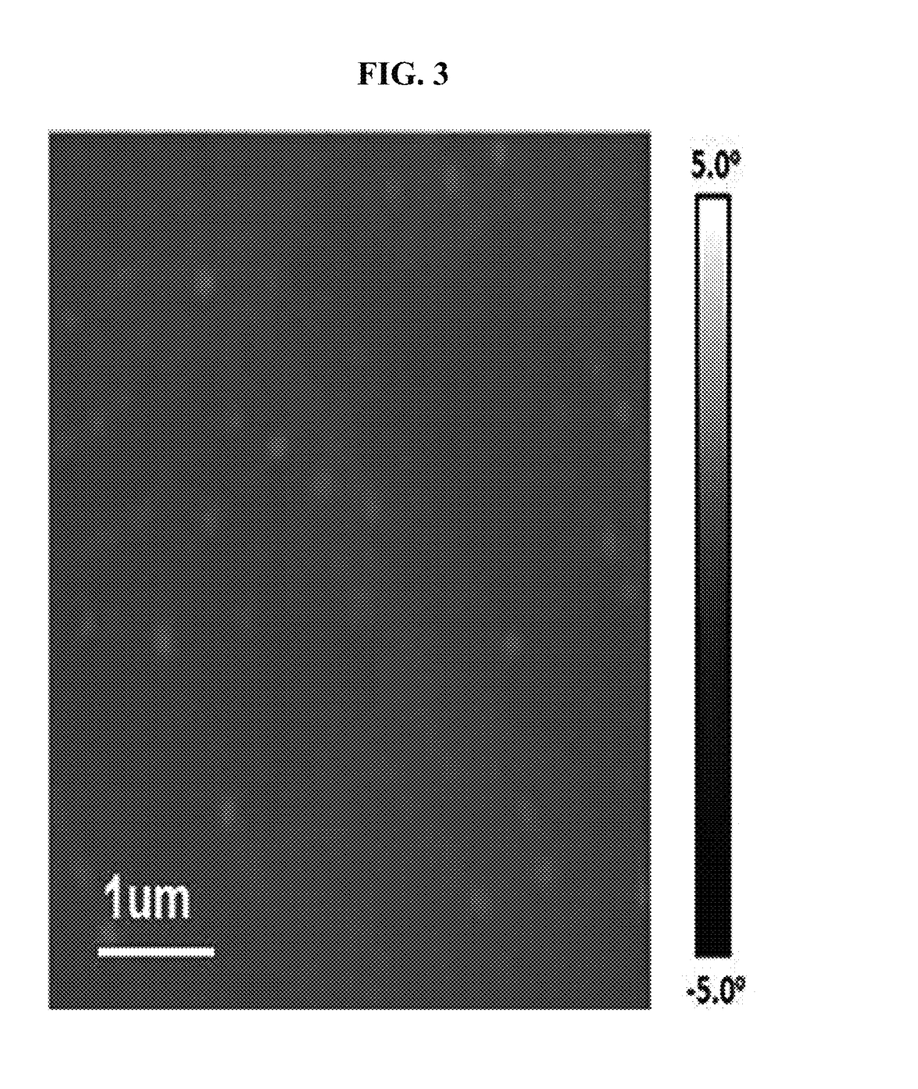
Figure 4:
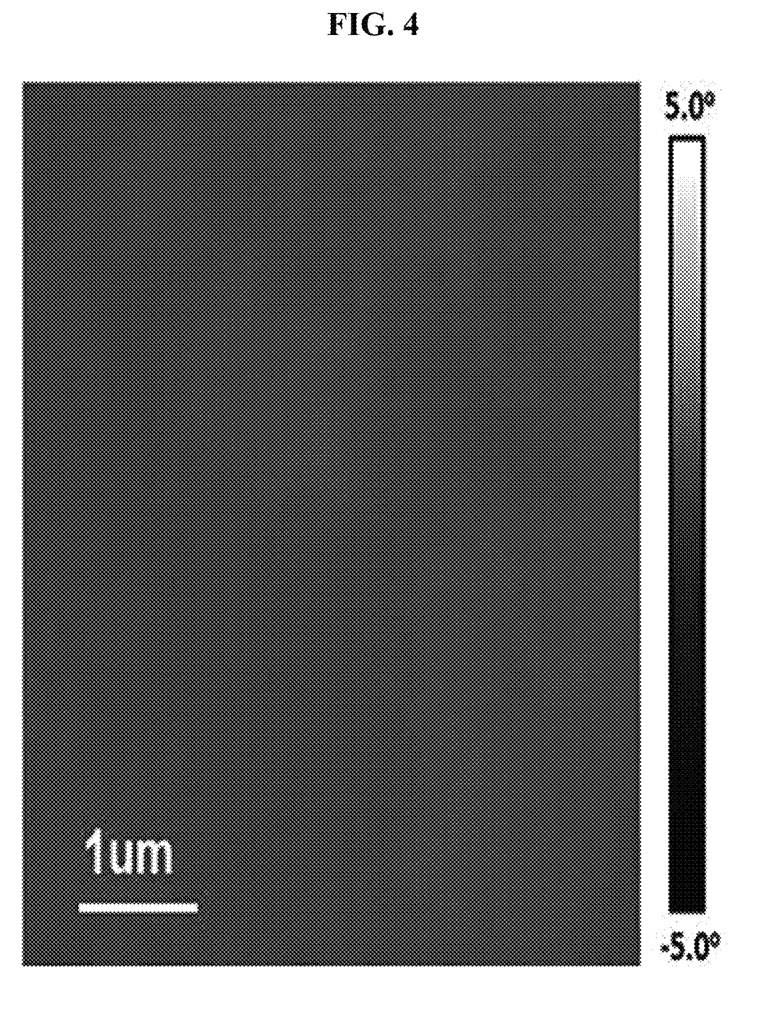

FIGS. 2 to 4 shows atomic force microscopy (AFM) phase-mode images of the solid electrolyte membranes of examples 1-1, 1-2 and 1-3 respectively. Seeing the morphology of the solid electrolyte membrane shown in FIGS. 2 to 4, in the case of example 1-1, polystyrene (in white) is randomly distributed in the solid electrolyte membrane. However, in the case of example 1-2, there is a reduction in polystyrene on the surface of the solid electrolyte membrane, and in the case of example 1-3, polystyrene is not observed on the surface of the solid electrolyte membrane. This implies that in the case of the solid electrolyte membrane according to the present disclosure, polystyrene forms a blocking layer in the solid electrolyte membrane through melting and phase separation when exposed for a long time in the high temperature condition.

Examples 2-1 to 2-2

Two solid electrolyte membrane samples of examples 2-1 and 2-2 are prepared through example 2. After example 2-1 is maintained in the room temperature condition and example 2-2 in the exposure condition to 100° C. for 12 hours, they are collected, and ionic conductivity is measured. The following [Table 2] summarizes the ionic conductivity measurement results.

TABLE 2

|  | Ionic conductivity (S/cm, 60° C.) |
|---|---|
| Example 2-1 | 3E−05 (3 × 10$^{-5}$) |
| Example 2-2 | 6E−08 (6 × 10$^{-8}$) |

Comparative Examples 1-1 to 1-2

Two solid electrolyte membrane samples are prepared through comparative example 1. After comparative example 1-1 is maintained in the room temperature condition and comparative example 1-2 in the exposure condition to 100° C. for 12 hours, they are collected, and ionic conductivity is measured. The following [Table 3] summarizes the ionic conductivity measurement results.

TABLE 3

|  | Ionic conductivity (S/cm, 60° C.) |
|---|---|
| Comparative example 1-1 | 1E−04 (1 × 10$^{-4}$) |
| Comparative example 1-2 | 1E−04 (1 × 10$^{-4}$) |

As a result of measuring ionic conductivity, it appears that the solid electrolyte membranes of examples 2-1 to 2-2 have a blocking layer in the solid electrolyte membrane through melting and phase separation of polystyrene as in the solid electrolyte membrane of examples 1-1 to 1-3. That is, when polystyrene is randomly distributed in the solid electrolyte membrane, the solid electrolyte membrane exhibits a sufficient level of ionic conductivity to operate the battery, but when exposed to high temperature, the blocking layer is formed and the ionic conductivity sharply reduces. In contrast, the solid electrolyte membrane of comparative example 1-2 after maintained at high temperature exhibits the same ionic conductivity as comparative example 1-1.

2. Manufacture of all-Solid-State Battery

To prepare a slurry, an electrode active material NCM811 (LiNi$_{0.8}$Co$_{0.1}$Mn$_{0.1}$O$_2$), a conductive material vapor grown carbon fibers (VGCFs) and a polymer-based solid electrolyte (PEO+LiTFSI, 18:1 mole ratio) are mixed at a weight ratio of 80:3:17, and the mixture is added to acetonitrile and stirred to prepare an electrode slurry. The electrode slurry is applied to a 20 μm thick aluminum current collector using a doctor blade, and the result is dried under a vacuum at 120° C. for 4 hours. Subsequently, the vacuum dried result is rolled using a roll press to obtain an electrode having the electrode loading of 2 mAh/cm$^2$, the electrode layer thickness of 48 μm and the porosity of 22 vol %.

The prepared positive electrode is punched into a round shape of 1.4875 cm$^2$. A lithium metal thin film cut into a round shape of 1.7671 cm$^2$ is prepared as a counter electrode. Each of the solid electrolyte membranes obtained in example 1 and comparative example 1 is interposed between the two electrodes to manufacture a coin-type half-cell.

TABLE 4

|  | Discharge capacity (mAh/g, 4.15 V) |
|---|---|
| Example 3-1 | 142 |
| Example 3-2 | 27 |
| Example 3-3 | — |

TABLE 4-continued

| | Discharge capacity (mAh/g, 4.15 V) |
|---|---|
| Comparative example 2-1 | 156 |
| Comparative example 2-2 | 158 |

Three all-solid-state batteries are prepared using the solid electrolyte membrane of example 1. After example 3-1 is maintained in the room temperature condition, example 3-2 in the exposure condition to 100° C. for 1 hour, and example 3-3 in the exposure condition to 100° C. for 12 hours, they are collected, and discharge capacity is measured. Additionally, two all-solid-state batteries are prepared using the solid electrolyte membrane of comparative example 1. After comparative example 2-1 is maintained in the room temperature condition and comparative example 2-2 in the exposure condition to 100° C. for 12 hours, they are collected, and discharge capacity is measured. The above [Table 4] summarizes the discharge capacity results.

The discharge capacity is measured under the following condition. The initial efficiency is evaluated by charging/discharging the batteries manufactured in each example and comparative example under the following condition.

Charged at 0.05 C up to 4.15V in CC/CV mode, 0.02 C cut-off
Discharged at 0.05 C up to 3V in CC mode As can be seen from the above [Table 4], the battery with the solid electrolyte membrane according to the present disclosure may control the operation of the battery by rapidly reducing the ionic conductivity of the solid electrolyte membrane when exposed to high temperature. Accordingly, it is possible to ensure heat resistance safety of the battery.

What is claimed is:

1. A solid electrolyte membrane for an all-solid-state battery, comprising:
    a mixture of a polymer material (A) having low ionic conductivity and a solid electrolyte material (B),
    wherein the solid electrolyte material (B) comprises a polymer-based solid electrolyte material in an amount of 90 wt % or more based on 100 wt % of the solid electrolyte material (B),
    wherein the polymer-based solid electrolyte material comprises a composite of a polymer resin and a lithium salt, and the polymer resin is a copolymer comprising a polymerizable unit that constitutes the polymer material (A),
    wherein the solid electrolyte membrane has ionic conductivity of $1 \times 10^{-7}$ S/cm or above,
    either a glass transition temperature or a melting temperature of the polymer material (A) or both is 150° C. or less; and
    wherein during operation of the battery, the solid electrolyte membrane forms an ion conduction blocking layer comprising the polymer material (A), the ion conduction blocking layer being formed in the solid electrolyte membrane by a temperature change-induced phase separation of the solid electrolyte material (B) and the polymer material (A), and wherein the temperature change is a temperature rise.

2. The solid electrolyte membrane according to claim 1, wherein the polymer material (A) has ionic conductivity of $9 \times 10^{-8}$ S/cm or less, and the solid electrolyte material (B) has ionic conductivity of $1 \times 10^{-7}$ S/cm or above.

3. The solid electrolyte membrane according to claim 1, wherein the polymer material (A) comprises at least one selected from the group consisting of a polyolefin-based polymer, a polystyrene-based polymer, a polyacrylate-based polymer, a polycarbide-based polymer and a polyester-based polymer.

4. The solid electrolyte membrane according to claim 1, wherein the polymer resin comprises at least one selected from the group consisting of a polyether-based polymer, a polycarbonate-based polymer, an acrylate-based polymer, a polysiloxane-based polymer, a phosphazene-based polymer, a polyethylene derivative, an alkylene oxide-based polymer, a phosphate ester-based polymer, polyalginate lysine, polyester sulfide, polyvinyl alcohol, a polyvinylidene fluoride-based polymer and a polymer including an ionic dissociable group, and wherein the polymer resin further comprises the polymerizable unit that constitutes the polymer material (A) in a polymer chain of the polymer resin.

5. The solid electrolyte membrane according to claim 1, wherein the polymerizable unit comprises at least one selected from the group consisting of an olefin-based polymerizable unit, a styrene-based polymerizable unit, an acryl-based polymerizable unit, a carbide-based polymerizable unit, and an ester-based polymerizable unit.

6. The solid electrolyte membrane according to claim 1, wherein the polymer resin comprises Polystyrene-co-Polyethylene oxide.

7. The solid electrolyte membrane according to claim 1, wherein the polymer resin comprises the polymerizable unit that constitutes the polymer material (A) in an amount of 51 wt % to 99 wt % based on 100 wt % of the polymer resin.

8. The solid electrolyte membrane according to claim 1, wherein the polymer material (A) is present in an amount of 7 parts by weight to 80 parts by weight based on 100 parts by weight of the solid electrolyte material (B).

9. The solid electrolyte membrane according to claim 1, wherein the polymer material (A) has a molecular weight (Mn) of 1 kg/mol to 10,000 kg/mol.

* * * * *